United States Patent [19]

Ward

[11] Patent Number: 4,721,004
[45] Date of Patent: Jan. 26, 1988

[54] TRANSMISSION GEAR SELECTOR APPARATUS

[75] Inventor: Kevin W. Ward, Davenport, Iowa

[73] Assignee: Caterpillar Inc., Peoria, Ill.

[21] Appl. No.: 4,013

[22] Filed: Jan. 16, 1987

[51] Int. Cl.$^4$ .............................................. F16H 57/06
[52] U.S. Cl. ........................................ 74/476; 74/526
[58] Field of Search ................. 74/473 R, 476, 526

[56] References Cited

U.S. PATENT DOCUMENTS

| | | | |
|---|---|---|---|
| 1,250,355 | 12/1917 | Robinson et al. | 74/476 |
| 1,709,169 | 4/1929 | Froesch | 74/476 |
| 3,626,780 | 12/1971 | Lowder et al. | 74/473 R |
| 3,645,149 | 2/1972 | Fitzpatrick et al. | 74/473 R |
| 3,677,105 | 7/1972 | Dence | 74/477 |
| 3,934,485 | 1/1976 | Ratliff | 74/473 R |
| 3,998,110 | 12/1976 | O'Brien et al. | 74/476 |
| 4,022,078 | 5/1977 | Malott | 74/476 X |
| 4,275,614 | 6/1981 | Okubo et al. | 74/476 |
| 4,291,589 | 9/1981 | Highland | 74/526 |
| 4,633,728 | 1/1987 | May | 74/476 |
| 4,638,678 | 1/1987 | Gorman et al. | 74/476 |

*Primary Examiner*—Allan D. Herrmann
*Attorney, Agent, or Firm*—Charles E. Lanchantin, Jr.

[57] ABSTRACT

A rugged and yet simple transmission gear selector apparatus includes a gear shift lever assembly having a lower lever portion mounted on a frame for pivotal movement about a first axis, an upper lever portion mounted on the lower lever portion for pivotal movement about a second axis normal the first axis, and with the upper level portion extending upwardly through a guide slot having a forward position and a reverse operating position therealong at the opposite sides of a longitudinal plane. An inhibitor mechanism is provided for blocking direct movement of the lever assembly between the positions and requiring a circuitous movement of the upper lever portion under an increased resistance in order to prevent the inadvertent selection of reverse speed by the vehicle operator.

14 Claims, 5 Drawing Figures

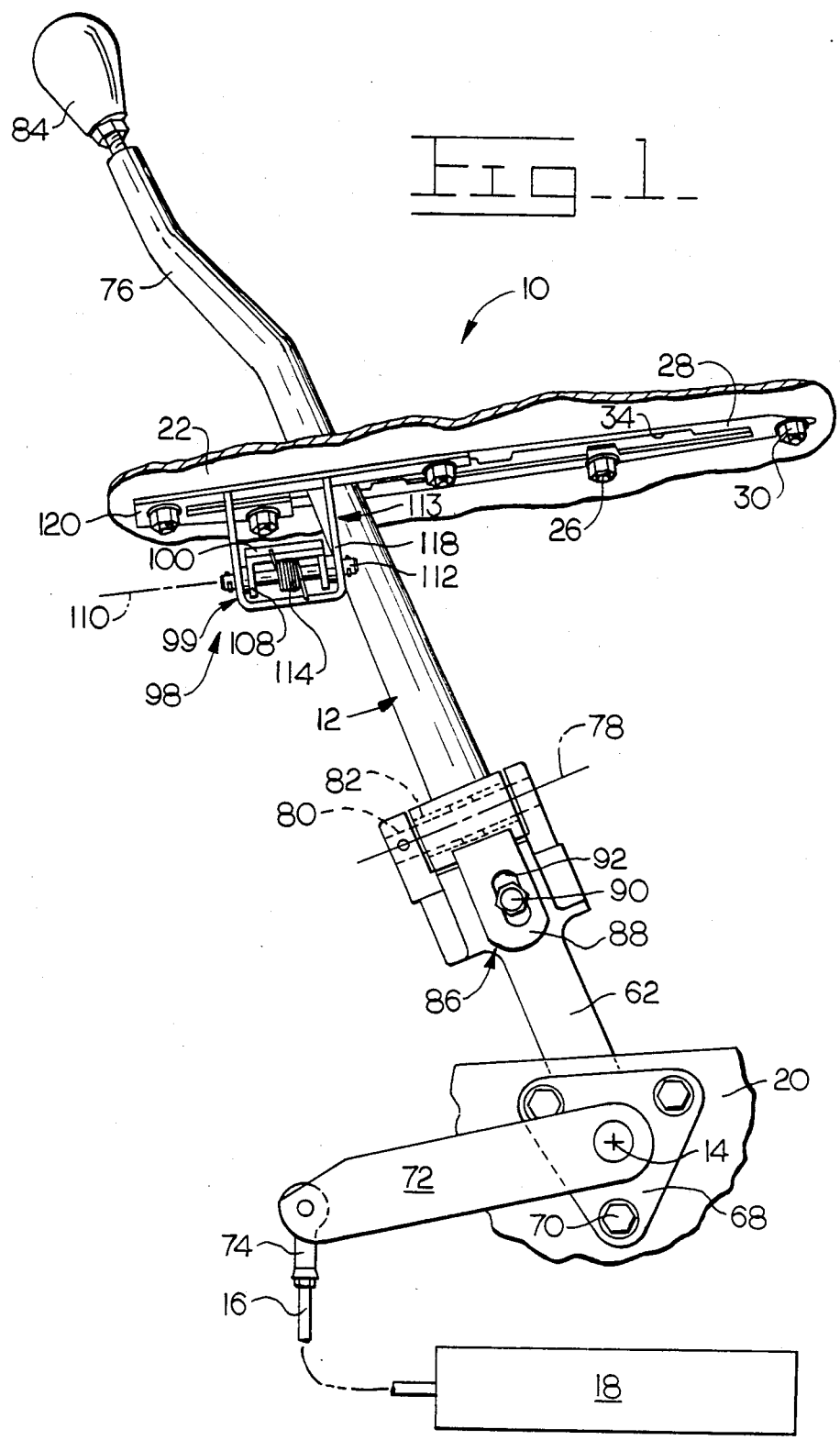

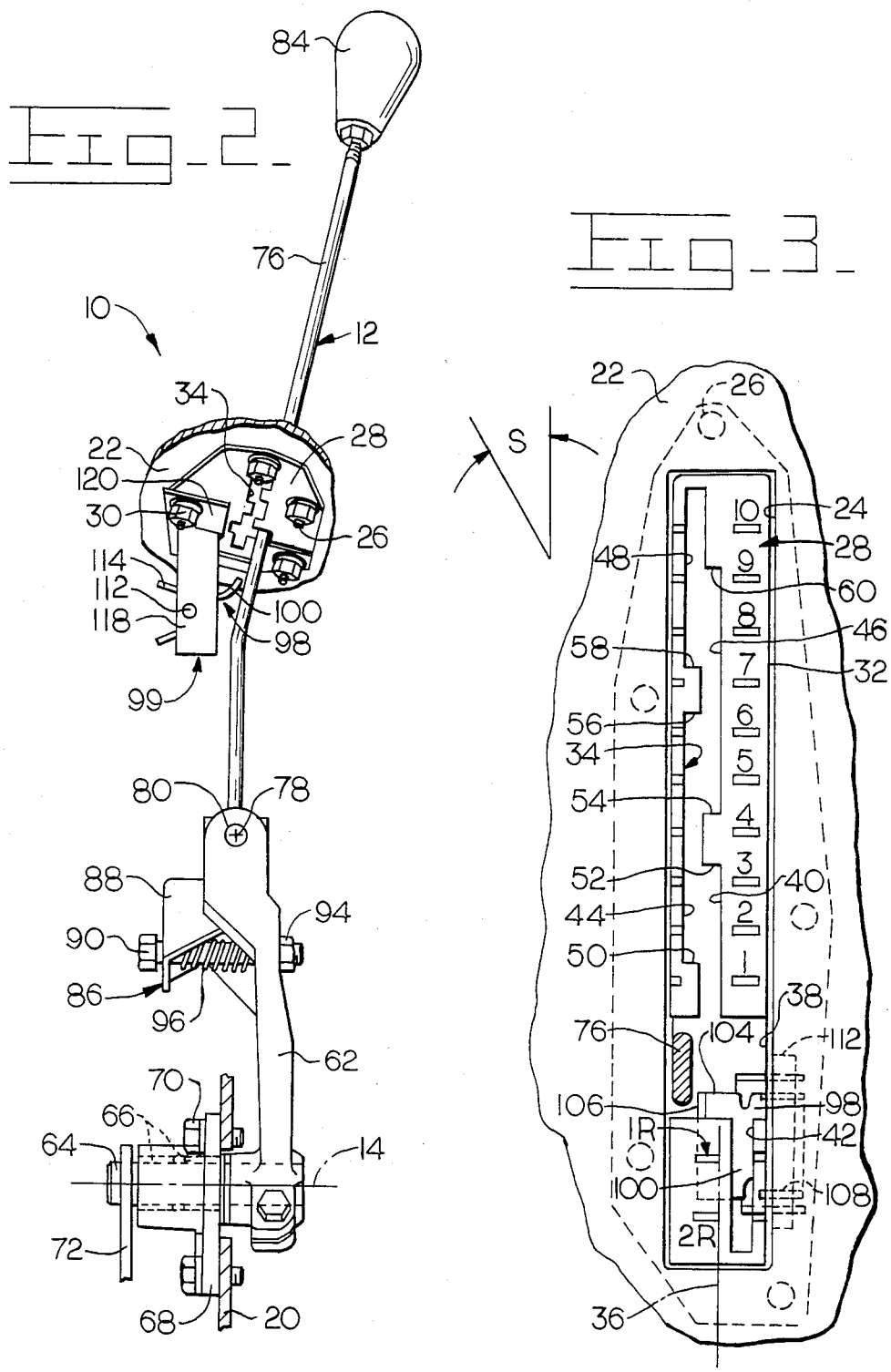

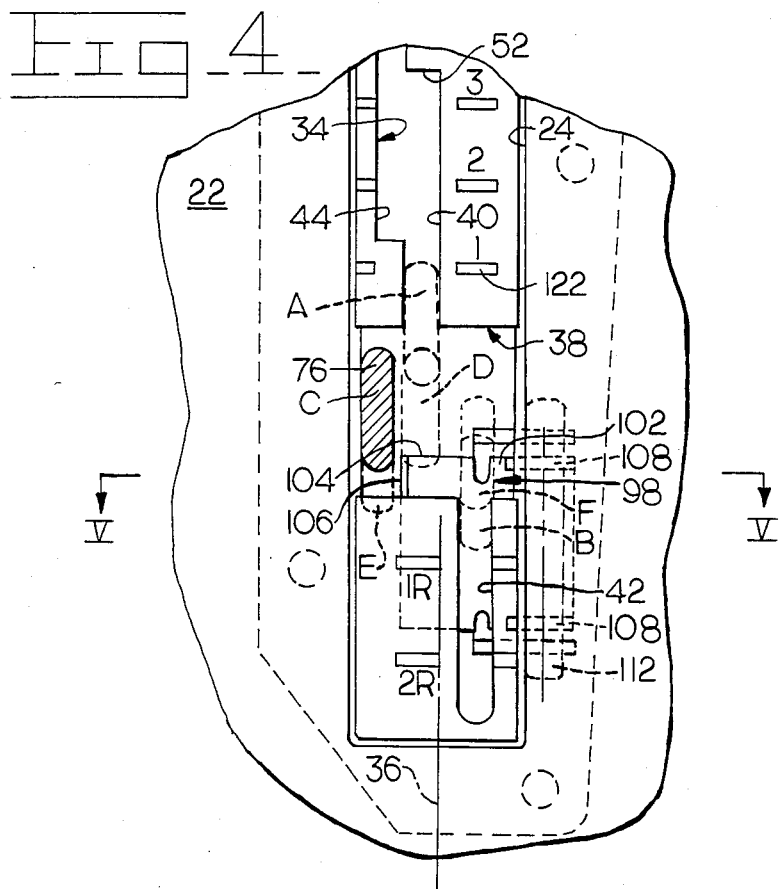
Fig_4_
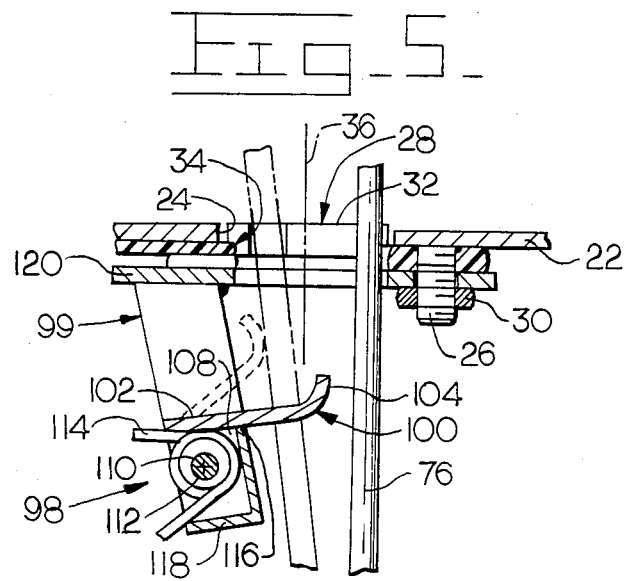
Fig_5_

TRANSMISSION GEAR SELECTOR APPARATUS

DESCRIPTION

1. Technical Field

This invention relates to transmission controls and more particularly to an improved apparatus for blocking and inhibiting the movement of a gear shift lever assembly within a profiled guide slot.

2. Background Art

There are many complex transmission control or gear shift lever assemblies than can be moved both longitudinally and transversely in preselected patterns to establish the desired forward and reverse operating speeds of a vehicle, and to establish the desired neutral mode therewith for parking or starting the vehicle. Some of these are equipped with gates that will lock the lever assembly in a particular position for parking purposes.

One of the problems with these lever assemblies is that some can be manually moved too easily from a forward operating mode to a reverse operating mode. In order to minimize this difficulty, various devices have been incorporated which undesirably have required rotation or depression of the lever assembly before a reverse operating condition could be obtained. These movements are generally tiring and vexatious to the operator. One relatively simple inhibitor that has been used employs a resistance in the form of a spring loaded plunger which contacts an element of the lever assembly at one particular location. Thereafter, a conscious effort on the part of the vehicle operator is required to overcome the plunger or force when moving the lever assembly between that location and another location.

Shifting into reverse too easily has also been experienced with a lever assembly for operating a transmission control unit having a control member lontigudinally movable from a forward gear to the reverse gear through an intermediate neutral condition. Even after the lever assembly was forced to travel within a profiled slot defining an offset path, it was observed that a reverse operating mode could still be inadvertently selected.

Accordingly, what is desired is an effective and rugged gear selector apparatus for automatically inhibiting the normal movement of a gear shift lever assembly between two modes of operation of an associated transmission without requiring rotation or telescoping movement thereof that would be tiring. Furthermore, the apparatus should be of simple and economical construction, should be compatible with the shift pattern or slot in the guide member, and should require a conscientious effort on the part of the operator to overcome some resistance to the motion.

DISCLOSURE OF THE INVENTION

The present invention is directed to overcoming one or more of the above problems.

In one aspect of the present invention there is provided a transmission gear selector apparatus including a frame, a member defining a profiled guide slot, a gear shift lever assembly having a lower lever portion mounted for pivotal movement about a first axis and an upper lever portion mounted on the lower lever portion for pivotal movement about a second axis normal to the first axis and extending upwardly through the guide slot. Advantageously, the guide slot has a generally longitudinal plane and first and second operating positions located therealong at the laterally opposite sides of the plane, and an inhibitor mechanism is provided for blocking the direct longitudinal movement of the lever assembly from the first position to the second position and for requiring circuitous movement of the upper lever portion away from the plane and then toward the plane under increased resistance with the longitudinal movement of the lever assembly between the first and second positions.

Preferably, the inhibitor mechanism includes a spring loaded bracket pivotally connected to the frame of the apparatus and having two normally arranged side surfaces. One of the side surfaces initially blocks direct longitudinal movement of the lever assembly toward reverse, and requires that the lever assembly be moved laterally away and then longitudinally toward the reverse operating position to enable contact with the other side surface of the bracket. Whereupon the bracket imposes an increasing resistance load to movement of the lever assembly laterally toward the reverse operating mode and therewith assures a noticeable change to the operator prior to the selection of a reverse operating speed.

BRIEF DESCRIPTION OF THE DRAWINGS

FIG. 1 is a diagrammatic right side elevational view of the transmission gear selector apparatus of the present invention;

FIG. 2 is a diagrammatic front elevational view of the transmission gear selector apparatus of FIG. 1;

FIG. 3 is an enlarged top plan view of the apparatus of FIGS. 1 and 2 better illustrating the profiled guide slot with the upper lever portion shown in cross section for convenience, and indicating the oblique orientation of the guide slot;

FIG. 4 is a further enlarged and fragmentary view of the guide slot of FIGS. 1–3 illustrating in solid and broken lines the various positions of the cross section of the gear shift lever assembly that are required to move the transmission control member from a first forward speed to a first reverse speed; and FIG. 5 is a fragmentary and enlarged cross sectional view of the gear selector apparatus of the present invention as taken along line V—V in FIG. 4.

BEST MODE FOR CARRYING OUT THE INVENTION

A transmission gear selector apparatus 10 is illustrated in FIGS. 1 and 2 which includes a gear shift lever assembly 12 for operating the transmission of an agricultural tractor, earthmoving vehicle or the like. Pivotal movement of the lever assembly about a first axis 14 is effective to operatively position a control member 16, such as a cable or rod at the lower end thereof, to any one of a plurality of operating positions of an associated transmission control unit 18. In the instant embodiment, linear movement of the control member 16 is effective to select one of ten forward gear speeds, neutral, or one of two reverse speeds.

More particularly, the transmission gear selector apparatus 10 includes a frame 20 having a console cover 22 defining an elongate rectangular opening 24 therein as shown best in FIGS. 3 and 5. A plurality of threaded studs 26 are secured to the cover as by welding or the like in depending relation, and a guide member 28 of a plastic material such as nylon is releasably secured to the studs by a plurality of retaining nuts 30 so that a raised portion 32 of the guide member extends upwardly through the opening. The guide member defines a profiled or notched guide slot 34 that is so constructed and arranged as to aid the operator in positioning of the lever assembly 12 to one of a plurality of operating conditions. In the instant embodiment, the guide slot illustrated in FIG. 3 is oriented generally along a longitudinal mid-plane 36 disposed at a preselected angle S, for example 30 degrees, from the true longitudinal direction of normal travel of the vehicle. Such an oblique mounting of the guide member at the right hand side of the vehicle operator is helpful in conserving energy during shifting of the lever assembly and other juxtaposed associated control levers, not shown.

The guide slot 34 includes an enlarged square-like pocket 38 intermediate the forward and reverse gear positions corresponding generally to a neutral position of the lever assemby 12. A first longitudinal channel 40 located at the left side of the longitudinal plane 36 when viewing FIG. 3 opens on the pocket, and this general intersection location corresponds to a first forward gear position. A second longitudinal channel 42 is located at the right side of the longitudinal plane and opens on the pocket from the opposite direction. The latter intersection region corresponds to a first reverse gear position. Third, fourth and fifth interconnected, but offset longitudinal channels 44, 46, and 48 are also defined by the guide slot. These channels essentially form a plurality of notches and tabs that define lever blocking shoulders 50, 52, 54, 56, 58 and 60 at offset positions along the opposite sides of the guide slot.

Referring now to FIGS. 1 and 2, the gear shift lever assembly 12 has a lower lever portion 62 mounted on the frame 20 for pivotal movement about the first axis 14. Specifically, the lower lever portion includes a cylindrical shaft 64 which is rotatably supported by a pair of axially spaced bearings 66 within a support assembly 68. The support assembly 68 is releasably secured to the frame by a plurality of fasteners or bolts 70. The proximal end of a link 72 is fixedly secured to the shaft, and a coupling assembly 74 is releasably secured to the control member 16 and to the distal end of the link.

The gear shift lever assembly 12 also has an upper lever portion 76 mounted on the lower lever portion 62 for pivotal movement about a second axis 78 oriented normal to the first axis 14. A cylindrical shaft 80 is fixedly secured to the lower lever portion along the second axis and the upper lever portion is swingable thereon through another pair of axially spaced bearings 82. The upper lever portion extends upwardly through the guide slot 34 and has a control knob 84 at the upper end thereof.

A biasing mechanism 86 is provided by the gear selector apparatus 10 for continually urging the upper lever portion 76 pivotally about the second axis 78 in a clockwise direction when viewing FIG. 2 or in a direction toward the left side of the guide slot 34 when viewing FIG. 3. This biasing mechanism includes a generally U-shaped plate 88 fixedly secured to the upper lever portion, a guide bolt 90 extending through an elongate aperture 92 in the plate and through the lower lever portion 62, a nut 94 screwthreadably received on the bolt, and a coiled compression spring 96 encircling the bolt and disposed in load bearing engagement between the lower lever portion and the plate.

In accordance with a major feature of the present invention, an inhibitor mechanism or means 98 is provided for blocking longitudinal movement of the lever assembly 12 from the first forward gear to the first reverse gear, requiring an indirect or circuitous route thereof, and applying an increased resistance to movement thereof to prevent inadvertent selection of reverse by the vehicle operator. The inhibitor mechanism includes a support assembly 99 and a spring-biased swingable bracket 100 mounted thereon generally below a portion of the neutral pocket 38 and the second longitudinal channel 42. As shown in FIGS. 3, 4, and 5, the bracket has an upper plate 102 of generally J-shaped cross section defining a blocking side or edge 104 generally oriented normal to the longitudinal plane 36 and a lever biasing side or edge 106 oriented parallel to the longitudinal plane. A pair of ears 108 that depend from the upper plate are mounted for pivotal movement about a third axis 110 by being supported by a cylindrical pin 112 extending therethrough and forming a portion of the support assembly 99. A torsion spring 114 is mounted in encircling relation on the pin 112, and is adapted to continually urge the bracket 100 in a clockwise direction when viewing FIG. 5 against a suitable stop 116 on the support assembly. The support assembly also includes a depending U-shaped support bar 118 that is fixedly secured to the underside of an attachment plate 120. The ends of the torsion spring react against the support bar 118 and the upper plate 102. The attachment plate 120 is preferably releasably connected to the underside of the guide member 28 by the same retaining nuts 30.

INDUSTRIAL APPLICABILITY

In operation, the transmission control unit 18 can be placed in neutral with the gear shift lever assembly 12 being located as is shown in FIGS. 1 and 2. In neutral, the cross section of the upper lever portion 76 adjacent to and within the guide slot 34 is designated by the letter C in FIG. 4. At this stage, it is of note to appreciate that the biasing mechanism 86 shown best in FIG. 2 acts to continually urge the upper lever portion against the left edge of the guide slot.

The vehicle operator can move the lever assembly 12 away from that position and upwardly and to the right when viewing FIG. 4 in a relatively direct zig-zag path to the first gear forward position shown by phantom lines and designated by the letter A. In this location, the upper lever portion 76 is located partially within the first longitudinal channel 40 and with the front edge thereof aligned with a suitable indicia 122. Second and third forward gear positions are easily achieved by manually moving the lever assembly further along the first longitudinal channel 40, with the third gear position being visually observable by the juxtaposed disposition of the upper lever portion with the shoulder 52. A conventional detent device, not shown, within the transmission control unit 18 is helpful in centering the control member 16 in a particular gear positon. If the lever assembly is released by the operator at this stage, the biasing mechanism 86 would urge the upper lever portion 76 laterally to the left into the third longitudinal channel 44. Movement of the lever assembly along the third longitudinal channel allows the selection of any one of the third through sixth gear positions as can be visualized with reference to FIG. 3. Conscientious effort by the operator is required to upshift the transmission control unit 18 further because of the slight resistance required to overcome the biasing mechanism 86 in order to urge the upper lever portion 76 laterally to the right into the fourth longitudinal channel 46. In the fourth longitudinal channel 46, sixth through ninth gear positions are obtained; and in the fifth longitudinal channel 48, the ninth and tenth gear positions are obtained. All of the forward gear positions are capable of being selected independently of the inhibitor mechanism 98.

Assuming next that the vehicle is being operated in one of the first, second or third gear positons with the upper lever portion being held in the first longitudinal channel 40 of FIG. 4. In the event that a reverse operating speed is desired, the operator can move the upper lever portion 76 from the phantom line position identified by the letter A to the phantom line position identified by the letter D whereupon the blocking edge 104 of the inhibitor mechanism 98 prevents further longitudinal movement thereof. In order to obtain reverse, the operator must first move the upper lever portion 76 in a leftward lateral direction away from the longitudinal mid-plane 36 and away from the position identified by the letter D to the solid line C position. Thereafter, the upper lever portion must be moved longitudinally to the position designated by the letter E, and laterally rightward toward the mid-plane, whereupon the upper lever portion makes contact with the biasing edge 106 of the bracket 100. Further lateral movement of the upper lever portion to the left when viewing FIG. 5 will cause the bracket 100 to be rotated in a counterclockwise direction about the third axis 110 and with the operator becoming aware of the increased resistance of the torsion spring 114. When the upper lever portion reaches the position designated by the letter F, it may be moved into the second longitudinal slot 42 for selection of either the first or second reverse gear positions.

When going out of the reverse positions there is no blocking effect of the inhibitor mechanism 98, and the neutral position or the first forward position may be conveniently selected in a relatively direct manner.

Thus, it can be appreciated that the transmission gear selector apparatus 10 of the present invention is simple, rugged and economical in construction and requires movement of the lever assembly 12 in a more circuitous route only between the first forward and the first reverse gear positions. Moreover, the resistance provided by the inhibitor mechanism 98 is sufficient to alert the operator and prevent the inadvertent selection of reverse while not being as vexatious as rotating the lever assembly, depressing the lever assembly, or depressing a button, a latch or the like with a finger as is the case with prior art systems.

Other aspects, objects and advantages of this invention can be obtained from a study of the drawings, the disclosure, and the appended claims.

I claim:

1. A transmission gear selector apparatus of the type including a frame, a member defining a profiled guide slot, a gear shift lever assembly having a lower lever portion mounted on the frame for pivotal movement about a first axis and an upper lever portion mounted in the lower lever portion for pivotal movement about a second axis generally normal to the first axis and extending upwardly through the guide slot, the improvement comprising:

the guide slot having a generally longitudinal plane and first and second operating positions located therealong at the laterally opposite sides of the plane; and inhibitor means for blocking generally direct longitudinal movement of the lever assembly from the first position, to the second position, and requiring a circuitous movement of the upper lever portion away from the plane and then toward the plane under increased resistance with longitudinal movement of the lever assembly between the first and second positions.

2. The transmission gear selector apparatus of claim 1 wherein the inhibitor means includes a bracket, a support assembly for pivotally supporting the bracket in a preselected location relative to the guide slot, and a spring for biasing the bracket in a first rotational direction.

3. The transmission gear selector apparatus of claim 2 wherein the bracket defines a first side normal to and in a blocking relationship to longitudinal movement of the gear shift lever assembly.

4. The transmission gear selector apparatus of claim 3 wherein the bracket defines a second side generally normal to the first side and contactable by the upper lever portion during lateral movement thereof.

5. The transmission gear selector apparatus of claim 1 wherein the profiled guide slot has an enlarged square-like pocket, a first longitudinal channel opening on the pocket adjacent to the first operating position, and a second longitudinal channel opening oppositely on the pocket adjacent the second operating position.

6. The transmission gear selector apparatus of claim 5 wherein the inhibitor means includes a spring-biased swingable bracket located generally below a portion of the pocket and the second longitudinal channel.

7. The transmission gear selector apparatus of claim 6 wherein the bracket defines a blocking side normal to the longitudinal plane and a lever biasing side parallel to the longitudinal plane, the sides being at least partially located directly below the pocket.

8. The transmission gear selector apparatus of claim 6 including a transmission control unit and coupling means for operatively connecting the lower lever portion to the transmission control unit, and wherein the first operating position corresponds to a first forward gear and the second operating position corresponds to a first reverse gear of the transmission control unit.

9. The transmission gear selector apparatus of claim 1 wherein the inhibitor means includes biasing means for continually urging the upper lever portion of the gear shift lever assembly pivotally about the second axis in a direction away from the plane and the second position.

10. The transmission gear selector apparatus of claim 9 wherein the inhibitor means includes a bracket, support means for pivotally mounting the bracket below the guide slot, and a spring for biasing the bracket in a preselected rotational direction, the bracket being in the path of travel of the upper lever portion when it is moved between the first and second operating positions.

11. A transmission gear selector apparatus of the type including a frame, a member defining a profiled guide slot, a gear shift lever assembly having a lower lever portion mounted on the frame for pivotal movement about a first axis and an upper lever portion mounted on the lower lever portion for pivotal movement about a second axis generally normal to the first axis and extending upwardly through the guide slot, the improvement comprising:

the guide slot being elongate in the longitudinal direction and having a first forward gear position and a first reverse gear position therealong; and an inhibitor mechanism so positioned and arranged as to block direct longitudinal movement of the lever assembly from the first forward gear position to the first reverse gear position and to require a circuitous path of travel of the upper lever portion while increasing the resistance to the lateral movement of the upper lever portion prior to selection of the first reverse gear position.

12. The transmission gear selector apparatus of claim 11 wherein the guide slot defines an enlarged pocket corresponding to a neutral gear position, and the inhibitor mechanism includes a spring-biased bracket pivotally connected to the frame and located partially below the pocket.

13. The transmission gear selector apparatus of claim 12 wherein the bracket has a blocking side and a lever biasing side normal to the blocking side, the sides being contactable by the lever assembly.

14. The transmission gear selector apparatus of claim 13 including a biasing mechanism for continually urging the upper lever portion pivotally about the second axis in a preselected direction with respect to the lower lever portion.

* * * * *